United States Patent
Kashyap

(10) Patent No.: US 12,012,556 B2
(45) Date of Patent: Jun. 18, 2024

(54) DENSE PHASE RISER TO MAXIMIZE LIGHT OLEFINS YIELDS FOR NAPHTHA CATALYTIC CRACKING

(71) Applicant: SABIC Global Technologies B.V., Bergen op Zoom (NL)

(72) Inventor: Mayank Kashyap, Sugar Land, TX (US)

(73) Assignee: SABIC GLOBAL TECHNOLOGIES B.V., Bergen op Zoom (NL)

(*) Notice: Subject to any disclaimer, the term of this patent is extended or adjusted under 35 U.S.C. 154(b) by 177 days.

(21) Appl. No.: 17/632,569

(22) PCT Filed: Jul. 21, 2020

(86) PCT No.: PCT/IB2020/056849
§ 371 (c)(1),
(2) Date: Feb. 3, 2022

(87) PCT Pub. No.: WO2021/024068
PCT Pub. Date: Feb. 11, 2021

(65) Prior Publication Data
US 2022/0275285 A1 Sep. 1, 2022

Related U.S. Application Data

(60) Provisional application No. 62/883,051, filed on Aug. 5, 2019.

(51) Int. Cl.
*C10G 11/18* (2006.01)
*B01J 8/18* (2006.01)
*B01J 8/28* (2006.01)
*C10G 11/05* (2006.01)

(52) U.S. Cl.
CPC ............ *C10G 11/18* (2013.01); *B01J 8/1818* (2013.01); *B01J 8/1854* (2013.01); *C10G 11/05* (2013.01); *C10G 11/182* (2013.01); *C10G 2300/1044* (2013.01); *C10G 2400/20* (2013.01)

(58) Field of Classification Search
CPC ...... C10G 11/18; C10G 11/182; B01J 8/1818; B01J 8/1854; B01J 8/28
See application file for complete search history.

(56) References Cited

U.S. PATENT DOCUMENTS

| | | | |
|---|---|---|---|
| 3,053,641 A | 9/1962 | Nagy et al. | |
| 3,353,925 A | 11/1967 | Baumann et al. | |
| 3,671,420 A | 6/1972 | Wilson et al. | |
| 4,416,765 A * | 11/1983 | Chester | C10G 11/05 502/67 |
| 4,436,613 A * | 3/1984 | Sayles | C10G 11/182 208/77 |
| 4,830,728 A | 5/1989 | Herbst et al. | |
| 4,892,643 A * | 1/1990 | Herbst | C10G 11/18 208/70 |
| 7,491,315 B2 | 2/2009 | Eng et al. | |
| 7,619,127 B2 | 11/2009 | Smith | |
| 8,383,052 B2 | 2/2013 | Niccum | |
| 2004/0064007 A1 | 4/2004 | Beech et al. | |
| 2004/0076554 A1 | 4/2004 | Kuechler et al. | |
| 2005/0152814 A1 | 7/2005 | Lattner et al. | |
| 2007/0197846 A1 | 8/2007 | Beech et al. | |
| 2007/0232843 A1 | 10/2007 | Beech et al. | |
| 2009/0012339 A1* | 1/2009 | Choi | C07C 7/04 585/651 |
| 2009/0117017 A1 | 5/2009 | Long et al. | |
| 2009/0288985 A1* | 11/2009 | Long | C10G 69/14 208/57 |
| 2010/0286459 A1 | 11/2010 | Gauthier et al. | |
| 2012/0123179 A1 | 5/2012 | Qi et al. | |
| 2013/0168289 A1 | 7/2013 | Saidulu et al. | |
| 2014/0356248 A1* | 12/2014 | Mehlberg | B01J 8/1845 422/187 |
| 2016/0074847 A1* | 3/2016 | Al-Hazmi | B01J 29/40 585/653 |
| 2018/0079973 A1 | 3/2018 | Chen et al. | |
| 2019/0330125 A1* | 10/2019 | Park | C07C 5/48 |

FOREIGN PATENT DOCUMENTS

| | | |
|---|---|---|
| CN | 103059926 A | 4/2013 |
| CN | 104583373 A | 4/2015 |
| CN | 107961744 A | 4/2018 |
| CN | 109705905 A | 5/2019 |
| WO | WO2012004809 A1 | 1/2012 |

OTHER PUBLICATIONS

International Search Report and Written Opinion from PCT/IB2020/056849 dated Nov. 3, 2020, 13 pages.

* cited by examiner

*Primary Examiner* — Randy Boyer
(74) *Attorney, Agent, or Firm* — Norton Rose Fulbright US LLP

(57) ABSTRACT

Systems and methods for producing light olefins via catalytic cracking of naphtha are disclosed. A naphtha feed stream and lift gas stream are fed into a dense phase riser reactor operated with a high solid volume fraction, a high superficial velocity, minimum back mixing. The effluent stream from the dense phase riser reactor is further separated, in a secondary reactor, to form a gaseous product stream and a catalyst stream. The catalyst stream is stripped to remove the hydrocarbons adsorbed on the catalyst particles. The stripped catalyst is regenerated in a regenerator.

20 Claims, 2 Drawing Sheets

DENSE PHASE RISER TO MAXIMIZE LIGHT OLEFINS YIELDS FOR NAPHTHA CATALYTIC CRACKING

CROSS REFERENCE TO RELATED APPLICATIONS

This application is a national phase application under 35 U.S.C. § 371 of International Application No. PCT/IB2020/056849 filed Jul. 21, 2020, which claims priority to U.S. Provisional Patent Application No. 62/883,051 filed Aug. 5, 2019. The entire contents of each of the above-referenced disclosures is specifically incorporated by reference herein without disclaimer.

FIELD OF INVENTION

The present invention generally relates to systems and methods for producing light olefins. More specifically, the present invention relates to systems and methods for producing light olefins via catalytic cracking naphtha in a dense phase riser reactor.

BACKGROUND OF THE INVENTION

Light olefins ($C_2$ to $C_4$ olefins) are building blocks for many chemical processes. Light olefins are used to produce polyethylene, polypropylene, ethylene oxide, ethylene chloride, propylene oxide, and acrylic acid, which, in turn, are used in a wide variety of industries such as the plastic processing, construction, textile, and automotive industries. Generally, light olefins are produced by steam cracking naphtha and dehydrogenating paraffin.

Over the last few decades, the demand for light olefins has been consistently increasing. For one of the conventional methods of producing light olefins, the overall efficiency is relatively low because the overall selectivity of naphtha to light olefins is limited. Consequently, the steam cracking process generates a large amount of hydrocarbons that are recycled to the steam cracking unit. As hydrocarbons have to be hydrogenated before they are recycled back to the steam cracking unit, the large amount of hydrocarbons for recycling can demand a large amount of hydrogen and energy in the hydrogenation process, resulting in high production cost.

Another method for producing light olefins includes catalytic cracking of naphtha in a conventional fluidized bed reactor. However, due to back mixing in the fluidized bed reactor, the yield for light olefins can be relatively low. Furthermore, conventional fluidized bed reactors for catalytic cracking are usually operated with low average solid volumetric fraction and low gas-solids contact efficiency due to the limitation of superficial gas velocities in the fluidized bed. Therefore, the conventional methods often result in high methane formation due to thermal cracking and increased production cost for light olefins. Overall, while methods of producing light olefins exist, the need for improvements in this field persists in light of at least the aforementioned drawbacks for the methods.

BRIEF SUMMARY OF THE INVENTION

A solution to at least some of the above-mentioned problems associated with the production process for light olefins using naphtha as the feed material has been discovered. The solution resides in a method of producing light olefins that includes using a dense phase riser reactor to catalytically crack naphtha. The superficial gas velocity in the dense phase riser reactor is significantly higher than the conventional methods. This can be beneficial for at least providing high solid volumetric fraction in the dense phase riser reactor, thereby reducing the occurrence of thermal cracking of the naphtha. Additionally, the lift gas used in the dense phase riser reactor does not contain steam. Thus, zeolite based catalyst, which has higher efficiency than non-zeolite based catalyst, can be used and is not subject to de-alumination by steam. Moreover, this method limits the back mixing in the dense phase riser reactor, as characterized by wide residence time distribution (RTD) with relative variance of less than 0.25, resulting in improved olefins to aromatics ratio in the effluent from the dense phase riser reactor. Therefore, the method of the present invention provides a technical solution to at least some of the problems associated with the currently available methods for producing light olefins mentioned above.

Embodiments of the invention include a method of producing light olefins. The method comprises contacting, in a dense phase riser reactor, naphtha with catalyst particles under reaction conditions sufficient to produce a first product comprising one or more olefins, wherein the reaction conditions comprise a solid volume fraction of 0.06 to 0.12 in the dense phase riser reactor. The method comprises flowing a mixture of the first product, the catalyst particles, and unreacted naphtha to a cyclone system disposed in a secondary reactor, wherein the secondary reactor is stacked on top of a catalyst regenerator.

Embodiments of the invention include a method of producing light olefins. The method comprises contacting, in a dense phase riser reactor, naphtha with catalyst particles under reaction conditions sufficient to produce a first product comprising one or more olefins, wherein the reaction conditions comprise a solid volume fraction of 0.06 to 0.12 in the dense phase riser reactor. The method comprises flowing a mixture of the first product, the catalyst particles, and unreacted naphtha to a cyclone system disposed in a secondary reactor, wherein the secondary reactor is stacked on top of a catalyst regenerator. The method comprises separating, in the cyclone system, the first product from the catalyst particles. The method comprises stripping, in a stripper disposed in the regenerator, hydrocarbon vapor from the catalyst particles to produce stripped catalyst particles. The method comprises regenerating, in the regenerator, the stripped catalyst particles.

Embodiments of the invention include a reaction unit for producing olefins. The reaction unit includes a dense phase riser reactor comprising a housing, a feed inlet disposed on a lower half of the housing and adapted to receive a feed material into the housing, a lift gas inlet disposed on lower half of the housing and adapted to receive a lift gas into the housing, a catalyst inlet disposed on the lower half of the housing and adapted to receive catalyst into the housing, and an outlet disposed on the top half of the housing and adapted to release an effluent of the dense phase riser from the housing. The reaction unit further includes a secondary reactor in fluid communication with the outlet of the dense phase riser reactor. The secondary reactor comprises one or more cyclones adapted to separate the effluent of the dense phase riser reactor to form a gaseous stream comprising gaseous products and a solid stream comprising the catalyst. The reaction unit further still includes a regenerator in fluid communication with the secondary reactor, adapted to receive the solid stream from the secondary reactor and regenerate the catalyst of the solid stream. The regenerator is in fluid communication with the catalyst inlet of the dense phase riser reactor.

The following includes definitions of various terms and phrases used throughout this specification.

The terms "about" or "approximately" are defined as being close to as understood by one of ordinary skill in the art. In one non-limiting embodiment the terms are defined to be within 10%, preferably, within 5%, more preferably, within 1%, and most preferably, within 0.5%.

The terms "wt. %", "vol. %" or "mol. %" refer to a weight, volume, or molar percentage of a component, respectively, based on the total weight, the total volume, or the total moles of material that includes the component. In a non-limiting example, 10 moles of component in 100 moles of the material is 10 mol. % of component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification, include any measurable decrease or complete inhibition to achieve a desired result.

The term "effective," as that term is used in the specification and/or claims, means adequate to accomplish a desired, expected, or intended result.

The term "raffinate," as the term is used in the specification and/or claims, means the rest of a product stream, from which a target component or components have been removed.

The use of the words "a" or "an" when used in conjunction with the term "comprising," "including," "containing," or "having" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The process of the present invention can "comprise," "consist essentially of," or "consist of" particular ingredients, components, compositions, etc., disclosed throughout the specification.

The term "primarily," as that term is used in the specification and/or claims, means greater than any of 50 wt. %, 50 mol. %, and 50 vol. %. For example, "primarily" may include 50.1 wt. % to 100 wt. % and all values and ranges there between, 50.1 mol. % to 100 mol. % and all values and ranges there between, or 50.1 vol. % to 100 vol. % and all values and ranges there between.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

For a more complete understanding, reference is now made to the following descriptions taken in conjunction with the accompanying drawings, in which.

DETAILED DESCRIPTION OF THE INVENTION

Currently, light olefins including ethylene, propylene, butenes can be produced by steam cracking or catalytic cracking of naphtha. However, the overall conversion rate to light olefins for steam cracking naphtha is relatively low. Furthermore, the production costs for steam cracking naphtha are high as steam cracking of naphtha produces a large amount of raffinate, which needs to be hydrogenated before it is recycled back to the steam cracking unit. Thus, the large amount of raffinate results in high demand for hydrogen and energy in the hydrogenation process. Conventional processes of catalytically cracking naphtha generally have relatively low superficial gas velocities and extremely high catalyst to oil ratio in the catalyst bed, which leads to challenges to maintain pressure balance in the reactor. Furthermore, the conventional catalytic cracking of naphtha uses steam as lift gas, which prevents using zeolite based catalyst, which has a high catalytic efficiency for light olefins production. The present invention provides a solution to at least some of these problems. The solution is premised on a method including catalytically cracking naphtha in a reaction unit that comprises a dense phase riser reactor. This method is capable of retaining high solid volumetric fraction along with a high superficial gas velocity in the dense phase riser reactor, thereby reducing the thermal cracking of naphtha and increasing yield of light olefins. Moreover, this method limits back mixing of the catalyst and hydrocarbons in the dense phase riser reactor. Thus, the selectivity to light olefins is increased over conventional methods. Additionally, this method can use a lift gas that does not contain steam such that zeolite based catalyst can be used in the reaction unit, resulting in improved light olefins production efficiency. These and other non-limiting aspects of the present invention are discussed in further detail in the following sections.

A. System for Catalytically Cracking Naphtha to Produce Light Olefins

Figure 1:
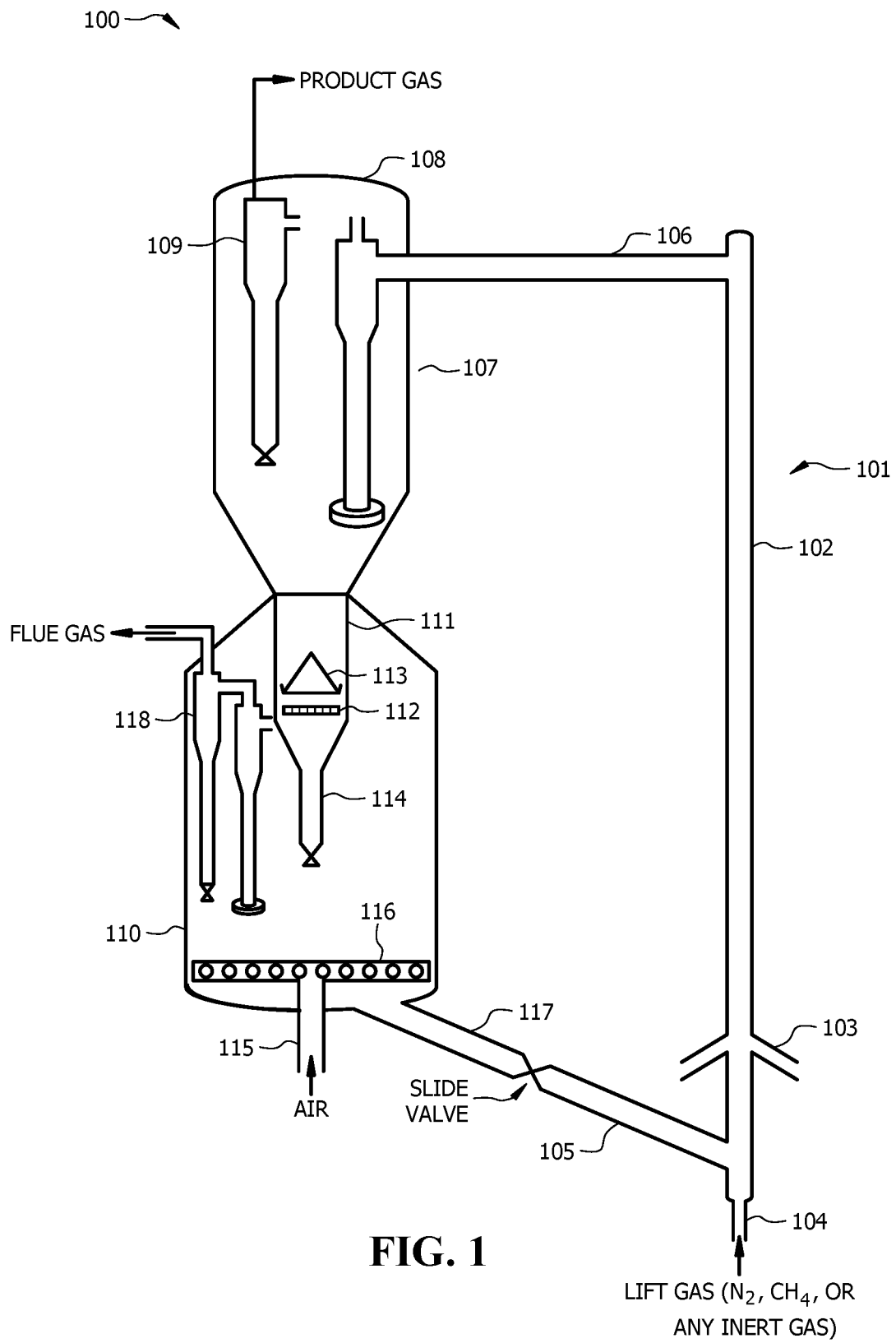
FIG. 1 shows a schematic diagram of a reaction unit for producing light olefins, according to embodiments of the invention.

In embodiments of the invention, a reaction unit for producing light olefins via catalytic cracking of naphtha comprises a dense phase riser reactor, a secondary reactor for gas-solid separation, and a regenerator. With reference to FIG. 1, a schematic diagram is shown of reaction unit 100 that is configured to produce light olefins ($C_2$ to $C_4$ olefins) and with improved production efficiency and yield of light olefins, compared to conventional steam cracking or catalytic cracking processes. According to embodiments of the invention, reaction unit 100 may include dense phase riser reactor 101 comprising housing 102, feed inlet 103, lift gas inlet 104, catalyst inlet 105, and effluent outlet 106. In embodiments of the invention, dense phase riser reactor 101 is a fluidized bed reactor.

In embodiments of the invention, housing 102 is made of carbon steel, refractory, or combinations thereof. Housing 102 is adapted to host catalytic cracking of naphtha. According to embodiments of the invention, feed inlet 103 may be disposed at a lower half of housing 102 and adapted to receive a feed stream therein. In embodiments of the invention, the feed stream includes naphtha. In embodiments of the invention, lift gas inlet 104 is disposed at the lower half of housing 102 and adapted to receive a lift gas stream in housing 102. In embodiments of the invention, lift gas inlet 104 may be disposed below feed inlet 103. The lift gas stream may include nitrogen, methane, steam, any inert gas, or combinations thereof. In embodiments of the invention, catalyst inlet 105 is disposed on lower half of housing 102. Catalyst inlet 105 may be adapted to receive catalyst particles into housing 102. Non-limiting examples for the catalyst particles may include zeolite. According to embodiments of the invention, the catalyst particles have a particle size in a range of 75 to 120 μm and all ranges and values there between including ranges of 75 to 78 μm, 78 to 81 μm, 81 to 84 μm, 84 to 87 μm, 87 to 90 μm, 90 to 93 μm, 93 to 96 μm, 96 to 99 μm, 99 to 102 μm, 102 to 105 μm, 105 to 108 μm, 108 to 111 μm, 111 to 114 μm, 114 to 117 μm, and 117 to 120 μm. The catalyst particles have a density in a range of 1000 to 1700 kg/m$^3$ and all ranges and values there between including ranges of 1000 to 1100 kg/m$^3$, 1100 to 1200 kg/m$^3$, 1200 to 1300 kg/m$^3$, 1300 to 1400 kg/m$^3$, 1400 to 1500 kg/m$^3$, 1500 to 1600 kg/m$^3$, and 1600 to 1700 kg/m$^3$. The fluidized bed in dense phase riser reactor 101 may have an overall bulk density of 70 to 145 kg/m$^3$ and all ranges and values there between including ranges of 70 to 75 kg/m$^3$, 75 to 80 kg/m$^3$, 80 to 85 kg/m$^3$, 85 to 90 kg/m$^3$, 90 to 95 kg/m$^3$, 95 to 100 kg/m$^3$, 100 to 105 kg/m$^3$, 105 to 110 kg/m$^3$, 110 to 115 kg/m$^3$, 115 to 120 kg/m$^3$, 120 to 125 kg/m$^3$, 125 to 130 kg/m$^3$, 130 to 135 kg/m$^3$, 135 to 140 kg/m$^3$, and 140 to 145 kg/m$^3$. In embodiments of the invention, catalyst inlet 105 may be disposed above lift gas inlet 104. According to embodiments of the invention, lift gas inlet 104 is disposed below feed inlet 103 and catalyst inlet 105.

In embodiments of the invention, dense phase reactor 101 may be substantially cylindrical. Dense phase riser reactor 101 may have a height to diameter ratio in a range of 8 to 20 and all ranges and values there between including ranges of 8 to 10, 10 to 12, 12 to 14, 14 to 16, 16 to 18, and 18 to 20. In embodiments of the invention, dense phase riser reactor 101 has an inner diameter in a range of 2.0 to 2.75 m and all ranges and values there between. According to embodiments of the invention, dense phase riser reactor 101 comprises outlet 106 in fluid communication with secondary reactor 107 such that an effluent of dense phase riser reactor 101 flows from dense phase riser reactor 101 to secondary reactor 107.

Effluent from dense phase riser reactor 101 may include unreacted naphtha, light olefins, lift gas, spent catalyst particles, and any other by-products. Effluent from dense phase riser reactor 101 may further include aromatics. According to embodiments of the invention, secondary reactor 107 is adapted to separate the effluent from dense phase riser reactor(s) 101 to form a product gas stream and a spent catalyst stream. The product gas stream may include light olefins, unreacted naphtha, aromatics, lift gas, by-products, or combinations thereof. The spent catalyst stream may include spent catalyst particles, hydrocarbons adsorbed on the spent catalyst particles, lift gas, or combinations thereof.

According to embodiments of the invention, secondary reactor 107 comprises secondary reactor housing 108 and one or more cyclones 109 adapted to separate the effluent from each dense phase riser reactor 101 to form a spent catalyst stream comprising spent catalyst particles and a product gas stream comprising product gases from dense phase riser reactor 101. In embodiments of the invention, each cyclone 109 in secondary reactor 107 is single- or multiple-stage cyclone. Each cyclone 109 may be in fluid communication with a dipleg. The dipleg is adapted to transfer catalyst particles from the cyclone to the dense bed close to the bottom of secondary reactor 107. In embodiments of the invention, the dipleg for each cyclone 109 is further in fluid communication with a splash plate and/or a trickle valve. The splash plate and/or trickle valve may be adapted to avoid bypass of gas up the dipleg of a cyclone.

In embodiments of the invention, a bottom end of secondary reactor 107 may be in fluid communication with regenerator 110 such that spent catalyst stream flows from secondary reactor 107 to catalyst regenerator 110. In embodiments of the invention, regenerator 110 is adapted to strip hydrocarbons adsorbed on the spent catalyst particles and regenerate the spent catalyst after the stripping process. Regenerator 110 may be further adapted to separate flue gas from the catalyst. According to embodiments of the invention, secondary reactor 107 is stacked on top of regenerator 110 such that the spent catalyst particles can directly flow from secondary reactor 107 to regenerator 110 without any additional driving force other than gravity.

According to embodiments of the invention, regenerator 110 comprises stripper 111 configured to strip hydrocarbons adsorbed on the spent catalyst particles. Stripper 111 may comprise a stripping gas sparger 112 configured to release stripping gas for contacting the spent catalyst. Non-limiting examples for the stripping gas can include nitrogen, methane, flue gas, and combinations thereof. Stripper 111 may further comprise stripper internals 113 configured to enhance counter-current contacting between down-flowing stream (an emulsion phase) and up-flowing bubbles stream in stripper 111. Stripper internals 113 may include disk structured internals, chevron structured internals, packing internals, subway grating internals, or combinations thereof. Stripper internals 113 may further comprise standpipe 114 adapted to transfer catalyst particles from stripper 111 to regenerator 110 and a slide valve adapted to control flow rate of catalyst particles from stripper 111 to regenerator 110. In embodiments of the invention, catalyst regenerator 110 further comprises air inlet 115 in fluid communication with air sparger 116 that is disposed in catalyst regeneration unit 112 such that air is supplied into regenerator 110 through air inlet 115 and air sparger 116. According to embodiments of the invention, catalyst regenerator 110 further comprises one or more cyclones (e.g., cyclone 118) adapted to separate flue gas from the catalyst. The flue gas may include the flue gas produced during the catalyst regeneration process. According to embodiments of the invention, catalyst regenerator 110 comprises catalyst outlets 117, which is in fluid communication with catalyst inlet 105 of dense phase riser reactor 101 such that regenerated catalyst flows from catalyst regenerator 110 to dense phase riser reactor 101.

B. Method of Producing Aromatics and Olefins

Figure 2:
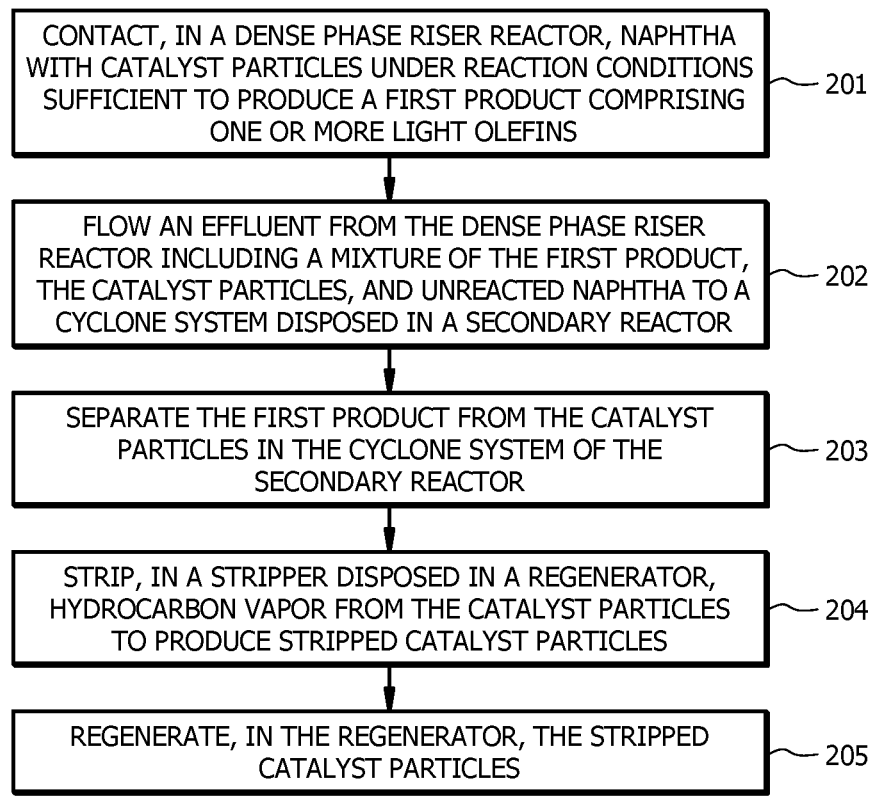
FIG. 2 shows a schematic flowchart of a method of producing light olefins, according to embodiments of the invention.

Methods of producing light olefins via catalytic cracking naphtha have been discovered. Embodiments of the method are capable of increasing solid volume fraction in the reaction unit, and minimizing occurrence of thermal cracking of hydrocarbons compared to conventional methods of catalytic cracking. Therefore, the methods may be able to significantly improve production efficiency of light olefins compared to conventional methods. As shown in FIG. 2, embodiments of the invention include method 200 for producing light olefins. Method 200 may be implemented by reaction unit 100, as shown in FIG. 1.

According to embodiments of the invention, as shown in block 201, method 200 may include contacting, in dense phase riser reactor 101, naphtha with catalyst particles under reaction conditions sufficient to produce a first product comprising one or more light olefins. In embodiments of the invention, the contacting at block 201 includes injecting, into dense phase riser reactor 101, the lift gas through lift gas inlet 104, naphtha through feed inlet 103, and/or catalyst through catalyst inlet 105 such that the catalyst particles and the naphtha make contact with each other and the materials in dense phase riser reactor 101 move upwards. In embodiments of the invention, the naphtha at the contacting step of block 201 comprises hydrocarbons with a final boiling point lower than 350° C. In embodiments of the invention, reaction conditions at block 201 may include a superficial gas velocity (SGV) in a fluidized bed of dense phase riser reactor 101 greater than 12 m/s, and preferably 12 to 21 m/s and all ranges and values there between including ranges of 12 to 15 m/s, 15 to 18 m/s, and 18 to 21 m/s. According to embodiments of the invention, at block 201, reaction conditions include a solid volume fraction (SVF) for a fluidized catalyst bed in dense phase riser reactor 101 in a range of 0.06 to 0.12 and all ranges and values there between including ranges of 0.06 to 0.07, 0.07 to 0.08, 0.08 to 0.09, 0.09 to 0.10, 0.10 to 0.11, and 0.11 to 0.12. The reaction conditions at block 201 may include a reaction temperature of 670 to 730° C. and all ranges and values there between including ranges of 630 to 640° C., 640 to 650° C., 650 to 660° C., 660 to 670° C., 670 to 680° C., 680 to 690° C., 690 to 700° C., 700 to 710° C., 710 to 720° C., 720 to 730° C. The reaction conditions at block 201 may further include a reaction pressure of 1 to 3 bar and all ranges and values there between including ranges of 1 to 1.5 bar, 1.5 to 2.0 bar, 2.0 to 2.5 bar, and 2.5 to 3.0 bar. The reaction conditions at block 201 may further include an average residence time in dense phase riser reactor 101 of 1 to 5 s and all ranges and values there between including ranges of 1 to 2 s, 2 to 3 s, 3 to 4 s, and 4 to 5 s. The reaction conditions at block 201 may further include a weighted hourly space velocity in a range of 0.3 to 3 $hr^{-1}$ and all ranges and values there between including ranges of 0.3 to 0.6 $hr^{-1}$, 0.6 to 0.9 $hr^{-1}$, 0.9 to 1.2 $hr^{-1}$ 1.2 to 1.5 $hr^{-1}$, 1.5 to 1.8 $hr^{-1}$, 1.8 to 2.1 $hr^{-1}$, 2.1 to 2.4 $hr^{-1}$, 2.4 to 2.7 $hr^{-1}$, and 2.7 to 3.0 $hr^{-1}$.

According to embodiments of the invention, the catalyst of dense phase riser reactor 101 includes zeolite. The catalyst particles may have a density of 1000 to 1700 $kg/m^3$ and all ranges and values there between including ranges of 1000 to 1010 $kg/m^3$, 1010 to 1020 $kg/m^3$, 1020 to 1030 $kg/m^3$, 1030 to 1040 $kg/m^3$, 1040 to 1050 $kg/m^3$, 1050 to 1060 $kg/m^3$, 1060 to 1070 $kg/m^3$, 1070 to 1080 $kg/m^3$, 1080 to 1090 $kg/m^3$, 1090 to 1100 $kg/m^3$, 1100 to 1110 $kg/m^3$, 1110 to 1120 $kg/m^3$, 1120 to 1130 $kg/m^3$, 1130 to 1140 $kg/m^3$, 1140 to 1150 $kg/m^3$, 1150 to 1160 $kg/m^3$, 1160 to 1170 $kg/m^3$, 1170 to 1180 $kg/m^3$, 1180 to 1190 $kg/m^3$, 1190 to 1200 $kg/m^3$, 1200 to 1300 $kg/m^3$, 1300 to 1400 $kg/m^3$, 1400 to 1500 $kg/m^3$, 1500 to 1600 $kg/m^3$, and 1600 to 1700 $kg/m^3$. At block 201, dense phase riser reactor 101 may be operated at a catalyst bed bulk density of 70 to 145 $kg/m^3$ and all ranges and values there between including ranges of 70 to 75 $kg/m^3$, 75 to 80 $kg/m^3$, 80 to 85 $kg/m^3$, 85 to 90 $kg/m^3$, 90 to 95 $kg/m^3$, 95 to 100 $kg/m^3$, 100 to 105 $kg/m^3$, 105 to 110 $kg/m^3$, 110 to 115 $kg/m^3$, 115 to 120 $kg/m^3$, 120 to 125 $kg/m^3$, 125 to 130 $kg/m^3$, 130 to 135 $kg/m^3$, 135 to 140 $kg/m^3$, and 140 to 145 $kg/m^3$.

According to embodiments of the invention, at block 201, the lift gas and the naphtha are flowed into dense phase riser reactor at a volumetric ratio of 0.4 to 0.8 and all ranges and values there between including ranges of 0.4 to 0.5, 0.5 to 0.6, 0.6 to 0.7, and 0.7 to 0.8. Dense phase riser reactor 101 may include a catalyst bed having a catalyst to oil ratio of 10 to 50 and all ranges and values there between including ranges of 10 to 15, 15 to 20, 20 to 25, 25 to 30, 30 to 35, 35 to 40, 40 to 45, and 45 to 50.

According to embodiments of the invention, as shown in block 202, method 200 further includes flowing an effluent from dense phase riser reactor 101 including a mixture of the first product, the catalyst particles, and unreacted naphtha to a cyclone system disposed in secondary reactor 107. The effluent from dense phase riser reactor 101 may further include the lift gas. In embodiments of the invention, the flowing at block 202 is propelled by the lift gas. Non-limiting examples of the lift gas may include nitrogen, methane, any inert gas, steam, or combinations thereof.

According to embodiments of the invention, as shown in block 203, method 200 may further comprise separating the first product from the catalyst particles in the cyclone system of secondary reactor 107. In embodiments of the invention, the separation at block 203 includes gas-solid separation to produce a gas product stream and a spent catalyst stream. According to embodiments of the invention, the gas product stream comprises the first product. In embodiments of the invention, the first product includes light olefins ($C_2$ to $C_4$ olefins), aromatics, unreacted naphtha, lift gas, by-products, or combinations thereof. The first product may further comprise unreacted naphtha, the lift gas, aromatics including BTX, or combinations thereof. The first product may have a weight ratio of light olefins to BTX in a range of 2 to 4 and all ranges and values there between. The yield of light olefins ($C_2$ to $C_4$ olefins) may be in a range of 46 to 48% and all ranges and values there between. The separating at block 203 may include passing the effluent of dense phase riser reactor 101 through one or more cyclones of secondary reactor 107. In embodiments of the invention, the product gas stream comprises 46 to 48 wt. % light olefins ($C_2$ to $C_4$ olefins).

According to embodiments of the invention, as shown in block 204, method 200 includes stripping, in stripper 111, which is disposed in regenerator 110, hydrocarbon vapor from the catalyst particles to produce stripped catalyst particles. In embodiments of the invention, the hydrocarbon vapor is adsorbed on the catalyst particles before the stripping at block 204. In embodiments of the invention, at block 204, a volumetric ratio of stripping gas to catalyst particles is in a range of 0.02 to 0.65 and all ranges and values there between including ranges of 0.02 to 0.05, 0.05 to 0.10, 0.10 to 0.15, 0.15 to 0.20, 0.20 to 0.25, 0.25 to 0.30, 0.30 to 0.35, 0.35 to 0.40, 0.40 to 0.45, 0.45 to 0.50, 0.50 to 0.55, 0.55 to 0.60, and 0.60 to 0.65.

According to embodiments of the invention, as shown in block 205, method 200 includes regenerating, in regenerator 110, the stripped catalyst particles. In embodiments of the invention, at block 205, the catalyst particles are regenerated in the presence of air. The regenerating at block 205 may be conducted at a regeneration temperature of 680 to 750° C. and all ranges and values there between including ranges of 680 to 690° C., 690 to 700° C., 700 to 710° C., 710 to 720°

C., 720 to 730° C., 730 to 740° C., and 740 to 750° C. In embodiments of the invention, the regenerating at block 205 produces regenerated catalyst and flue gas. The flue gas may be separated from the regenerated catalyst in cyclone(s) 118. In embodiments of the invention, the regenerated catalyst is flowed to dense phase riser reactor 101 through catalyst outlet 117. In embodiments of the invention, the catalytic cracking of method 200 has a yield of light olefins greater than 45%.

Although embodiments of the present invention have been described with reference to blocks of FIG. 2, it should be appreciated that operation of the present invention is not limited to the particular blocks and/or the particular order of the blocks illustrated in FIG. 2. Accordingly, embodiments of the invention may provide functionality as described herein using various blocks in a sequence different than that of FIG. 2.

The systems and process described herein can also include various equipment that is not shown and is known to one of skill in the art of chemical processing. For example, some controllers, piping, computers, valves, pumps, heaters, thermocouples, pressure indicators, mixers, heat exchangers, and the like may not be shown.

As part of the disclosure of the present invention, a specific example is included below. The example is for illustrative purposes only and is not intended to limit the invention. Those of ordinary skill in the art will readily recognize parameters that can be changed or modified to yield essentially the same results.

Example 1

Production of Light Olefins Via Catalytic Cracking

Experiments on the production of light olefins via catalytic cracking were conducted a in pilot-scale reaction unit of the present invention. The dense-phase riser reactor in the pilot-scale reaction unit was operated with high solid volume fractions and minimum backing mixing to maximize light olefin yields. The composition of the feedstock used in these experiments are shown in Table 1.

TABLE 1

Feedstock composition

| Normal paraffin (wt. %) | Iso-paraffin (wt. %) | Naphthenic species (wt. %) | Aromatics (wt. %) | Olefins (wt. %) | Others (wt. %) |
|---|---|---|---|---|---|
| 22-24 | 27-30 | 32-35 | 11-13 | <0.5 | <8 |

The reaction conditions for the reaction unit included a reaction temperature of 700° C., a catalyst regeneration temperature 710° C., a reaction pressure of 1.50 atm, a contact time of 1.03 to 1.16 seconds, a catalyst-to-oil ratio of 30, a weight hourly space velocity (WHSV) of 1.9 $h^{-1}$. The results of the yields of each major product for the experiments are shown in Table 2.

TABLE 2

Results from the pilot scale experiments

| | HD 3 m max Olefins* |
|---|---|
| CH4 | <10 |
| C2H4 | 14-16 |
| C2H4 + C3H6 | >35 |

TABLE 2-continued

Results from the pilot scale experiments

| | HD 3 m max Olefins* |
|---|---|
| C2H4 + C3H6 + C4H8 | >46 |
| BTX | 14-16 |
| C2H4 + C3H6 + C4H8 + BTX | >60 |
| C3H6/C2H4 ratio | 1.3-1.5 |
| C2H4 + C3H6 + C4H8/BTX ratio | >3 |

Table 2 shows the composition of the product stream produced from the pilot-reaction unit. The results shows that light olefins including $C_2$ to $C_4$ olefins have a combined percentage of more than 46%.

In the context of the present invention, at least the following 19 embodiments are described. Embodiment 1 is a method of producing light olefins. The method includes contacting, in a dense phase riser reactor, naphtha with catalyst particles under reaction conditions sufficient to produce a first product containing one or more olefins, wherein the reaction conditions include a solid volume fraction of 0.06 to 0.12 in the dense phase riser reactor. The method further includes flowing a mixture of the first product, the catalyst particles, and unreacted naphtha to a cyclone system located in a secondary reactor, wherein the secondary reactor is stacked on top of a catalyst regenerator. Embodiment 2 is the method of embodiment 1, wherein the reaction conditions include a contact time between naphtha and catalyst particles in a range of 1 to 2 seconds. Embodiment 3 is the method of any of embodiments 1 and 2, wherein the reaction conditions include a superficial gas velocity in the dense phase riser reactor in a range of 12 to 21 m/s. Embodiment 4 is the method of any of embodiments 1 to 3, wherein the reaction conditions further include a reaction temperature in a range of 670 to 730° C., a reaction pressure in a range of 1 to 3 bar, and a weight hourly space velocity in a range of 0.3 to 3 $hr^{-1}$. Embodiment 5 is the method of any of embodiments 1 to 4, wherein the dense phase riser reactor is operated such that there is substantially no back mixing of materials in the dense phase riser reactor. Embodiment 6 is the method of any of embodiments 1 to 5, wherein the dense phase riser reactor is operated such that reaction kinetics in the dense phase riser reactor substantially follows a plug flow reactor. Embodiment 7 is the method of any of embodiments 1 to 6, further including separating, in the cyclone system, the first product from the catalyst particles. The method further includes stripping, in a stripper located in the catalyst regenerator, hydrocarbon vapor from the catalyst particles to produce stripped catalyst particles. The method still further includes regenerating, in the catalyst regenerator, the stripped catalyst particles. Embodiment 8 is the method of any of embodiments 1 to 7, wherein the dense phase riser reactors is operated using a lift gas selected from the group consisting of nitrogen, methane, any inert gas, and combinations thereof. Embodiment 9 is the method of embodiment 8, wherein the lift gas contains less than 10 wt. % steam. Embodiment 10 is the method of any of embodiments 1 to 9, wherein the catalyst contains a zeolite based catalyst. Embodiment 11 is the method of any of embodiments 1 to 10, wherein the catalyst contains particles of average diameter in a range of 75 to 120 μm. Embodiment 12 is the method of any of embodiments 1 to 11, wherein the catalyst has a particle density of 1000 to 1200 kg/m³. Embodiment 13 is the method of any of embodiments 1 to 12, wherein the dense phase riser reactor includes a fluidized bed having a catalyst to oil ratio of 10 to 50. Embodiment 14 is the method of embodiment 13, wherein the fluidized bed in the dense phase riser reactor has a bulk density in a range of 70 to 145 kg/m³. Embodiment 15 is the method of any of embodiments 1 to 14, wherein the dense phase riser reactor is operated at a volumetric feed to lift gas ratio of 1.25 to 2.5.

Embodiment 16 is a reaction unit for producing aromatics. The reaction unit includes a dense phase riser reactor including a housing, and a feed inlet located on a lower half of the housing and adapted to receive a feed material into the housing. The dense phase riser reactor further includes a lift gas inlet located on bottom of the housing and adapted to receive a lift gas into the housing, a catalyst inlet located at the bottom of the housing and adapted to receive catalyst into the housing, and an outlet located on top of the housing and adapted to release an effluent of the dense phase riser from the housing. The reaction unit further includes a secondary reactor in fluid communication with the outlet of the dense phase riser reactor, wherein the secondary reactor includes one or more cyclones adapted to separate the effluent of the dense phase riser to form a gaseous stream containing gaseous products and a solid stream containing a catalyst. The reaction unit still further includes a regenerator in fluid communication with the secondary reactor, adapted to receive the solid stream from the secondary reactor and regenerate the catalyst of the solid stream, wherein the secondary reactor is stacked on top of the regenerator and the regenerator is in fluid communication with the catalyst inlet of the dense phase riser reactor. Embodiment 17 is the reaction unit of embodiment 16, wherein the regenerator further includes a stripper adapted to strip hydrocarbons adsorbed on catalyst particles of the solid stream using a stripping gas before the catalyst is regenerated. Embodiment 18 is the reaction unit of embodiment 17, wherein the stripping gas contains nitrogen, methane, flue gas, or combinations thereof. Embodiment 19 is the reaction unit of any of embodiments 16 to 18, wherein the regenerator further includes one or more cyclones adapted to separate flue gas from the catalyst.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. A method of producing light olefins; the method comprising:
   contacting, in a dense phase riser reactor, naphtha with catalyst particles under reaction conditions sufficient to produce a first product comprising one or more olefins, wherein the reaction conditions in the dense phase riser reactor comprise a solid volume fraction of 0.06 to 0.12 and a superficial gas velocity in a range of 12 to 21 m/s; and
   flowing a mixture of the first product, the catalyst particles, and unreacted naphtha to a cyclone system disposed in a secondary reactor, wherein the secondary reactor is stacked on top of a catalyst regenerator;
   wherein the reaction conditions further comprise a reaction temperature in a range of 670 to 730° C., a reaction pressure in a range of 1 to 3 bar.

2. The method of claim 1, wherein the reaction conditions comprise a contact time between naphtha and catalyst particles in a range of 1 to 2 seconds.

3. A method of producing light olefins; the method comprising:
   contacting, in a dense phase riser reactor, naphtha with catalyst particles under reaction conditions sufficient to produce a first product comprising one or more olefins, wherein the reaction conditions in the dense phase riser reactor comprise a solid volume fraction of 0.06 to 0.12 and a superficial gas velocity in a range of 12 to 21 m/s; and
   flowing a mixture of the first product, the catalyst particles, and unreacted naphtha to a cyclone system disposed in a secondary reactor, wherein the secondary reactor is stacked on top of a catalyst regenerator.

4. The method of claim 1, wherein the reaction conditions further comprise a weight hourly space velocity in a range of 0.3 to 0.6 hr$^{-1}$.

5. The method of claim 1, wherein the dense phase riser reactor is operated such that there is substantially no back mixing of materials in the dense phase riser reactor.

6. The method of claim 1, wherein the dense phase riser reactor is operated such that reaction kinetics in the dense phase riser reactor substantially follows a plug flow reactor.

7. The method of claim 1, wherein the lift gas contains less than 10 wt. % steam.

8. The method of claim 1, wherein the catalyst comprises a zeolite based catalyst.

9. The method of claim 1, wherein the catalyst comprises particles of average diameter in a range of 75 to 120 μm.

10. The method of claim 1, wherein the catalyst has a particle density of 1000 to 1200 kg/m³.

11. The method of claim 1, wherein the dense phase riser reactor comprises a fluidized bed having a catalyst to oil ratio of 10 to 50.

12. The method of claim 11, wherein the fluidized bed in the dense phase riser reactor has a bulk density in a range of 70 to 145 kg/m³.

13. The method of claim 1, wherein the dense phase riser reactor is operated at a volumetric feed to lift gas ratio of 1.25 to 2.5.

14. A reaction unit for producing aromatics, the reaction unit comprising:
   a dense phase riser reactor comprising:
   a housing comprising a catalyst, wherein the wherein the catalyst has a particle density of 1000 to 1200 kg/m³;
   a feed inlet disposed on a lower half of the housing and adapted to receive a feed material into the housing;
   a lift gas inlet disposed on bottom of the housing and adapted to receive a lift gas into the housing;
   a catalyst inlet disposed at the bottom of the housing and adapted to receive catalyst into the housing;
   an outlet disposed on top of the housing and adapted to release an effluent of the dense phase riser from the housing;

a secondary reactor in fluid communication with the outlet of the dense phase riser reactor, wherein the secondary reactor comprises one or more cyclones adapted to separate the effluent of the dense phase riser to form a gaseous stream comprising gaseous products and a solid stream comprising a catalyst; and a regenerator in fluid communication with the secondary reactor, adapted to receive the solid stream from the secondary reactor and regenerate the catalyst of the solid stream, wherein the secondary reactor is stacked on top of the regenerator and the regenerator is in fluid communication with the catalyst inlet of the dense phase riser reactor;

wherein the dense phase riser reactor is configured to provide a superficial gas velocity in a range of 12 to 21 m/s.

15. The reaction unit of claim 14, wherein the regenerator further comprises a stripper adapted to strip hydrocarbons adsorbed on catalyst particles of the solid stream using a stripping gas before the catalyst is regenerated.

16. The reaction unit of claim 15, wherein the stripping gas comprises nitrogen, methane, flue gas, or combinations thereof.

17. The reaction unit of claim 14, wherein the regenerator further comprises one or more cyclones adapted to separate flue gas from the catalyst.

18. The reaction unit of claim 15, wherein the regenerator further comprises one or more cyclones adapted to separate flue gas from the catalyst.

19. The method of claim 1, further comprising:
separating, in the cyclone system, the first product from the catalyst particles;
stripping, in a stripper disposed in the catalyst regenerator, hydrocarbon vapor from the catalyst particles to produce stripped catalyst particles; and
regenerating the stripped catalyst particles in the catalyst regenerator.

20. The method of claim 1, wherein the dense phase riser reactor is operated using a lift gas selected from the group consisting of methane an inert gas, and combinations thereof.

* * * * *